United States Patent [19]

White et al.

[11] Patent Number: 5,429,748
[45] Date of Patent: Jul. 4, 1995

[54] POLYMIDE MEMBRANE FOR SEPARATION OF SOLVENTS FROM LUBE OIL

[76] Inventors: Lloyd S. White, 5070 Summer Day La., Columbia, Md. 21044; I-Fan Wang, 3408 John Carroll Dr., Olney, Md. 20832; Bhupender S. Minhas, 7837 Flagstone Ct., Ellicott City, Md. 21043

[21] Appl. No.: 134,221

[22] Filed: Oct. 8, 1993

Related U.S. Application Data

[62] Division of Ser. No. 53,025, Apr. 23, 1993, Pat. No. 5,264,166.

[51] Int. Cl.$^6$ ............................................. B01D 69/12
[52] U.S. Cl. ................................ 210/654; 210/500.39
[58] Field of Search .............. 210/652, 500.39, 490, 210/654, 657, 650

[56] References Cited

U.S. PATENT DOCUMENTS

| | | | |
|---|---|---|---|
| 4,963,303 | 10/1990 | Anderson | 264/41 |
| 5,133,867 | 7/1992 | LaFreniere | 210/653 X |
| 5,310,415 | 5/1994 | Simmons et al. | 95/45 |

*Primary Examiner*—Frank Spear
*Attorney, Agent, or Firm*—Valerie E. Looper

[57] ABSTRACT

An improved asymmetric membrane fashioned from a polyimide for the liquid separation of solvents from lube oil. The membrane is based on a fully imidized polymer based on 5(6)-amino-1-(4'-aminophenyl)-1,3,3-trimethylindane polymer and benzophenone tetracarboxylic dianhydride.

10 Claims, No Drawings

POLYIMIDE MEMBRANE FOR SEPARATION OF SOLVENTS FROM LUBE OIL

This is a division of application Ser. No. 08/085,025, filed Apr. 23, 1993, now U.S. Pat No 5,264,166.

FIELD OF THE INVENTION

An improved asymmetric membrane can be fashioned from a polyimide and used for the low temperature separation of solvents from lube oil. Benefits are improved energy costs and throughput of product when the membrane separation technique is used in the solvent dewaxing process for lube oil.

BACKGROUND OF THE INVENTION

A polyimide, Matrimid ®, has been discovered to form good membranes for the low temperature separation of low molecular weight organic materials from solvents by hyperfiltration. The low molecular weight organic materials can have an average molecular weight of less than 500, while the solvents have a molecular weight of about 100. The separation is accomplished by contacting a liquid feed stream with the dense, active layer of a membrane, which is made from a specific asymmetric polyimide, and recovering the permeate, which is high purity solvent. This separation has particular utility in the industrial process for removal of wax from lube oil by use of solvents.

The lube oil is dewaxed using conventional solvent dewaxing techniques to produce a lube oil feedstream from which the remaining solvent must be removed. In this context, lube oil is a refinery feed stream which may contain a broad range of organic compounds. Although this application is written in terms of the specific first application of the invention, one of ordinary skill in the art will readily recognize that the invention can be used in other contexts, such as the processing of vegetable oils.

There are a number of alternative processes for solvent dewaxing of lube oil. For example, the waxy oil can be mixed with a quantity of warm solvent to form a mixture which is then cooled down to a temperature low enough for wax crystals to form by indirect heat exchange means, and then filtered.

Alternatively, the waxy oil can be directly contacted with volumes of cold dewaxing solvent to lower the temperature of the overall mixture.

Also, the waxy oil can be directly contacted with incremental volumes of cold solvent under conditions of high agitation at multiple stages in a staged chilling column or tower to reduce the temperature of the overall oil/solvent mixture low enough to precipitate at least a portion of the wax. Chilling may be conducted either entirely in the staged agitated chilling tower, or completed in other known ways.

A dewaxing process especially adapted for use in conjunction with the present invention is disclosed in a copending application "Lubricating Oil using Membrane Separation of Cold Solvent from Dewaxed Oil" by R. M. Gould, Attorney Docket No. 7030, filed of even date.

Typical dewaxing solvents include ketones having from 3-6 carbons, such as acetone, methyl ethyl ketone (MEK), methyl isobutyl ketone (MIBK); $C_6-C_6$ aromatic hydrocarbons such as toluene, xylene, benzene; mixtures of ketone with aromatics such as MEK with toluene; halogenated $C_1-C_4$ hydrocarbons such as methylene chloride, dichloroethane and mixtures thereof. Dewaxing solvents of choice are the ketones, and mixtures of ketones and aromatics such as MEK with MIBK or toluene.

Regardless of the procedure employed, once the waxy mixture is chilled to the wax separation temperature the precipitated wax is separated from the wax mixture via conventional separation procedures which typically include by way of illustration, filtration and centrifugation.

The dewaxed oil feed stream must now be separated into its respective oil and solvent components. The recovered oil will be used either directly or sent on for further processing and the recovered solvent will be recycled to the dewaxing process.

Solvent is normally separated from oil by distillation. Since solvent dewaxing typically employs solvent to oil ratios of anywhere from 1:1 to 10:1, more typically 3:1 to 6:1 (depending on the technique employed and the type of oil being processed) this means that tremendous volumes of liquids must be processed. Distillation, by its very nature, is an energy intensive operation. Selective permeation of the solvent through a membrane barrier is a technique which ought to reduce energy consumption and processing costs.

While membrane permeation in concept offers processing advantages for the treatment of lube oil, no commercial process yet exists. This type of separation is demanding because the membrane material must be resistant to both the solvent and the oil, and must be capable of effecting the separation. In this case, the chemical character of the molecules to be separated is similar because they are mutually soluble compounds of relatively low molecular weight. But since they differ slightly in molecular weight, the separation is made mainly on the basis of molecular size. Further, the low molecular weight organic materials can have an average weight of less than 500, often in the range of 300 to 400, while the solvents have a molecular weight of about 100. Also, the separation must occur at a high enough rate and yield to be economically competitive for commercial uses. A flow rate of at least about 2 gallons per square foot per day (GSFD) is required, preferably 4 or more and even more preferably about 6-12 GSFD. This flow rate must be combined with a yield, in terms of rejection of the low molecular weight organic (non-solvent) component, of at least about 80%, preferably greater than 90%, and even more preferably, greater than 95% rejection. In addition, as a practical matter, the separation is run at low temperatures, typically $+25°$ to $-25°$ F., which can cause a precipitous drop in membrane efficiency.

A variety of membranes have been proposed for the separation of solvent from lube oil. U.S. Pat. Nos. 4,541,972 and 4,678,555 issued to Wernick Sep. 17, 1985 and Jul. 7, 1987 respectively, disclose a cellulose acetate membrane for the separation of solvent from lube oil; U.S. Pat. Nos. 4,985,138 issued Jan. 15, 1991, 5,093,002 issued Mar. 3, 1992, and 5,102,551 issued Apr. 7, 1992, all to Pasternak, claim various composite membrane structures; U.S. Pat. No. 4,748,288 issued to Bitter et al. May 31, 1988 claims a dense membrane with a halogen substituted silicon compound; European Patent Application 427,338 A1 to Rujkens and Werner claims a plasma treated fluorosilicone membrane; European Patent Application 460,769 A1 and 460,770 A1 to Marinus and Tinnemans relate to composite membranes from interfacial polymerization and describe the separation of n-docosane from solvent; and U.S. Pat. No. 4,715,960, issued to Thompson Dec. 29, 1987, discloses the use of polycarbonates.

Polyimide-type membranes have been proposed for use for the separation of solvent from lube oil. U.S. Pat. No. 4,532,041 issued to Shuey et al. Jul. 30, 1985 relates to a membrane made from a polyimide for the separation of solvent from lube oil. The polyimide is a copolymer derived from the co-condensation of benzophenone 3,3′4,4′-tetracarboxylic acid dianhydride (BTDA) and a mixture of di(4-aminophenyl)methane and toluene diamine or the corresponding diisocyanates, 4,4′methylenebis(phenyl/isocyanate) and toluene diisocyanate, which is available as Upjohn Company's 2080D. None of the experimental results reported in this patent were based on low temperature operation.

invention will be apparent through the discussion herein.

SUMMARY OF THE INVENTION

An as metric polyimide membrane has been fashioned for the low temperature separation of low molecular weight organic materials from solvents. The structure of the polyimide, Matrimid, is shown below. The polyimide is also known as the polymer with 1 (or 3)-(4-aminophenyl)-2,3-dihydro-1,3,3 (or 1,1,3)-trimethyl-1H-inden-5-amine and 5,5′-carbonylbis-1,3-isobenzofurandione (CAS Number 62929-02-6). A common name for Matrimid is the polymer with diaminophenylindane and benzophenone tetracarboxylic dianhydride. It is available as XU-218 or Matrimid 5218 from Ciba Geigy.

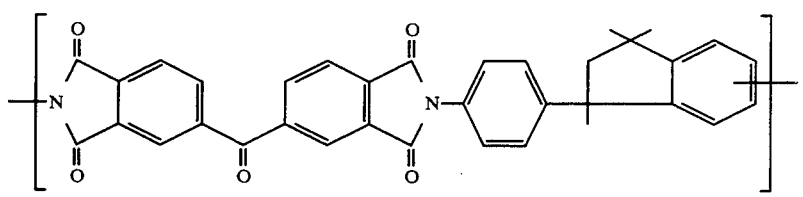

U.S. Pat. No. 5,133,867, issued to La Freniere Jul. 28, 1992 discusses the use of the same polyimide as that disclosed in the Shuey patent, above, for recovery of $C_3$–$C_6$ aliphatic hydrocarbons from hydrocarbon oils at low temperature.

Polyimide ultrafiltration membranes have been used to recover dewaxing aids from lube oil, see U.S. Pat. No. 4,836,927, issued to Wan Jun. 6, 1989. These dewaxing aids are high molecular weight polymers, and, in practice, the separation occurs at temperatures of about 70° C. to 250° C. Solvent is not separated. Further development of this concept is disclosed in U.S. Pat. Nos. 4,908,134 and 4,963,303, issued to Anderson on Mar. 13 and Oct. 16, 1990 respectively. These references disclose further refinement of the method of making the polyimide membranes, principally by use of the polyimide used in the present invention, and a pore former. The claimed membranes cannot be used with ketone-containing materials as fabricated.

U.S. Pat. No. 5,067,970, issued to Wang et al. Nov. 26, 1991, relates to an asymmetric membrane prepared from the polyimide of the present invention which is used for a gas separation, that is, of carbon dioxide from methane. Separation of liquids such as solvent from lube oil was not disclosed or suggested, and as can be seen from Example 1 as compared to Examples 2 to 6 below, the present invention shows greater utility for the liquid separation.

European Patent Publication 125 907 published Nov. 21, 1984 discusses the use of asymmetric polyimides for separation of dewaxing solvent from dewaxed oil in a lube oil dewaxing process. In Example 2, the polyimide of the present invention was tested, and characterized as "unsuitable for use".

OBJECT OF THE INVENTION

It is therefore an object of the present invention to provide a membrane for the separation of low molecular weight organic materials from solvents. The membrane should exhibit at least about 80% rejection of the low molecular weight materials at a commercially adequate flow rate in a temperature range of about 25° to −25° F. Other facets and advantages of the present Membranes can be made by dissolving the polymer in solvent to give a viscous solution, spreading the solution upon a support fabric, partially evaporating the solvent to form a film, and quenching the film in water. This precipitates the polymer and forms an asymmetric membrane by the phase inversion process. The membrane is subsequently treated by various methods, to yield a membrane compatible with lube oil and related solvents.

A polyimide polymer dope solution is prepared by dissolving the fully imidized polyimide polymer based on 5(6)-amino-1-(4′-aminophenyl)-1,3,3-trimethylindane in one or a mixture of the following water-miscible solvents: N-methyl-2-pyrrolidone, hereinafter referred to as NMP, tetrahydrofuran, hereinafter referred to as THF, N,N,-dimethylformamide, hereinafter referred to as DMF, dioxane, γ-butyrolactone, water, alcohols, ketones, and formamide.

The weight percent of the polyimide polymer in solution may range from 10 to 35% in the broadest sense, although a 15 to 30% range is preferable and a 20 to 28% range will produce the best results.

Additives such as viscosity enhancers may be present in amounts up to 3% by weight of the said polyimide polymer dope solution and these include polyvinyl pyrrolidones, polyethylene glycols and urethanes. Additionally additives such as void suppressors may be used in amounts up to 5% of the weight of said polyimide polymer dope solution, and in this case maleic acid produces the desired results.

Once the polyimide polymer is dissolved in the solvent system described, it is cast onto a substrate and a portion of the solvent may be evaporated under conditions sufficient to produce a thin, dense skin on the polyimide membrane. Typical evaporation conditions adequate for this purpose include air blown over the membrane surface at 15° to 25° C, for a duration of less than 30 seconds.

The dense ultra-thin top "skin" layer of the invention's asymmetric polyimide membrane is characterized by pore sizes below 50A Å in diameter, is highly resistant to the greater than 500 p.s.i. operating pressures and has high operating efficiency at the low temperatures found in the oil dewaxing process streams.

The coagulating or quenching medium may consist of water, alcohol, ketones or mixtures thereof, as well as additives such as surfactants, e.g,. Triton X-100® available from Aldrich Chemical Company, Milwaukee, Wis. (octylphenoxy-polyethoxyethanol). The conditions for effecting coagulation are conventional.

The asymmetric polyimide membranes of the present invention can be washed and dried according to the following techniques. Typically a water-soluble organic compound such as low molecular weight alcohols and ketones including but not limited to methanol, ethanol, isopropanol, acetone, methylethyl ketone or mixtures thereof and blends with water can be used for removing the residual casting solvent (e.g., NMP) from the membrane. Alternatively the membrane may be washed with water. Removal of the residual casting solvent may require successive wash blends in a sequential solvent exchange process. Both membrane efficiency and flow rate can be enhanced by the proper solvent exchange process.

The membrane is then contacted with a non-volatile conditioning agent dissolved in solvent. The conditioning agent maintains membrane properties for hyperfiltration of low molecular weight organic materials from solvents. Typical conditioning agents include substituted or unsubstituted long chain hydrocarbons, glycols, glycerols, and lube oils. The use of a conditioning agent allows the membrane to be processed, handled and stored in a dry state. The membrane is typically dried in air at ambient conditions to remove residual solvent.

It has been found that the nature of the substrate on which the membrane is cast can play an important role in preserving the cast membrane's integrity. While broad categories of backing are usable in gas separations, the liquid separation described herein presents certain subtle difficulties. The solvents used in the examples and in lube oil dewaxing swell many polymeric materials, causing expansion. The amount of shrink or expansion may not be readily visible, however shrinkage and expansion of a membrane sheet are important considerations when preparing a practical membrane device, such as a spiral-wound element. If the membrane expands, wrinkling of the membrane sheet can occur, causing delamination and cracks in the membrane surface. Shrinkage can cause tears in the membrane surface.

It has been found to be possible to condition a membrane by soaking in solvents before mounting in a device in order to eliminate shrinkage and expansion. In practice, this introduces several difficult handling problems in the preparation of spiral-wound elements. For example, the membrane has to be handled and assembled while wet with solvent. Also, volatile organic solvents would have to be used in an open system, which is a source of both safety and environmental concerns.

It has been found that by using an appropriate backing, that is, a backing exhibiting less that 2%, preferably less than 1% shrink or expansion in use, the membrane can be processed and handled in a dry state, without subsequent expansion when immersed in solvents. This is a significant improvement in the membrane process for solvent recovery from lube oil, because it can eliminate the conditioning step.

Heat treatment can also be used to increase membrane rejection of lube oil. After the coagulation step, the membrane may be heated to about 180° C. to about 320° C., preferably about 260° C. for about 15 seconds to 2 hours At about 260° C., the heating time is typically about 30 seconds. It is preferred that the membrane be air dried before heating.

Once the membranes are formed they may be processed into spirally wound modules, into hollow fiber configurations, or into flat sheet configurations.

Significant benefits can be obtained when the membranes just described are used to separate solvent from a dewaxed lube oil feedstream. This is because once the solvents are separated from lube oil, they can be directly recycled back into the dewaxing process. This reduces the volume of solvents sent to distillation columns, where solvent is normally recovered and recycled. Since solvent dewaxing processes are run at low temperatures (typically in the range of 25° to −25° F.), both heating and cooling costs are reduced. Also, the addition of a membrane unit can allow larger quantities of oil to be dewaxed, increasing total throughput of product.

The Examples below are for illustrative purposes only, and do not limit the invention, or the claims which follow them.

EXAMPLES

In the cases shown here, the asymmetric membranes separated lube oil from a typical dewaxing solvent mixture, containing methyl ethyl ketone (MEK) and toluene. The solvents preferentially permeated through the membrane, with high rejection of lube oil. The membranes were tested on a small bench unit consisting of three (3) test cells in series. The feed solution was continuously flushed over the membrane surfaces, and the permeate and retentate streams were combined and recycled. In general, the feed consisted of about 20% by weight 100N lube oil, 40% MEK, and 40% toluene. This feed was pressurized, cooled to about −10° C., and pumped over the surface of the membrane. Samples of permeate were then collected at various pressures and times.

Membrane samples were small disks with 14.2 cm² surface area. Flows were determined in ml/min and then converted to gallons per square foot per day (GSFD). The weight percentages of lube oil in the permeate and retentate streams were determined by gravimetric analysis. Sample sizes were kept at less than 1% by weight of the material, so that retentate and feed compositions were essentially equal. GC analysis was used to determine the ratio by weight of MEK to toluene in the solvent mixture. Rejection was calculated from the lube oil percentages with the formula % Rej=(1-% per/% ret) 100%.

Example 1

A gas separation-type membrane was prepared according to the teachings of U.S. Pat. No. 5,067,970.

A casting dope was prepared with 78g of Matrimid 5218 (Ciba-Geigy), 4.5 g formamide, 4.5 g maleic acid, 72 g THF, and 141 g NMP. The dope was cast with a 7 mil blade onto a web of nylon fabric at a speed of 2 ft/min. Air was blown over the surface of the membrane at a rate of 20 SCFH, and the membrane was then quenched in 6° C. water containing 0.01% Triton X-100, a surfactant available from Aldrich Chemical Company, Milwaukee, Wis. The membranes were then clipped flat to a solid support and air dried. When a membrane sample was mounted dry in a test cell and tested, it showed high flow rate (11.1 GSFD) at low pressure (50 psi), indicating failed membrane.

A membrane sample was conditioned by immersion in feed solution and then mounted while wet in a test cell. At 600 psi and 8° C., the membrane had 35% rejection of lube oil and 6.7 GSFD flow rate. This membrane appears to be undamaged, but rejection is unacceptably low.

Example 2

A membrane from Example 1 was taken while still in water and subjected to a solvent exchange process. The wet sample was immersed in isopropanol ("IPA") for three (3) hours, then placed overnight in the feed solution of 20% lube oil, 40% MEK, and 40% toluene. The sample was then clipped to a flat surface and air dried.

Membrane was presoaked in feed solution and then mounted in a test cell. At 600 psi and −6° C., the membrane had 81% rejection and 5.1 GSFD flow rate. This illustrates that a solvent exchange process can improve membrane rejection.

Example 3

A membrane from Example 2, after air drying, was heated at 260° C. for 30 seconds while clipped flat to a support plate. After conditioning in the feed solution, the membrane demonstrated 85% rejection and 5.4 GSFD at 600 psi and −1° C. Rejection improved with heat treatment.

Example 4

A casting dope was prepared from 78g Matrimid, 72 g THF, and 150 g NMP. The dope was cast with a 7 mil blade upon a web of nylon fabric at a speed of 4 ft/min. Air was blown over the surface of the membrane at a rate of 20 SCFH, and the membrane was then quenched in 18° C. water containing 0.01% Triton X-100.

The membrane was rinsed in water and then immersed in IPA for 15 minutes. IPA was replaced by immersion of the sample in n-hexane for 15 minutes. The membrane was then stored in 20% lube oil feed solution.

The membrane was directly tested without air drying. The membrane demonstrated 56% rejection and 8.1 GSFD at 600 psi and −4° C. After further compaction for 4 hours at 600 psi, the membrane demonstrated 75% rejection and 5.9 GSFD flow rate. Pressure compaction can improve membrane rejection.

Example 5

A casting dope was prepared with 78 g of Matrimid 5218 (Ciba-Geigy), 4.5 g formamide, 4.5 g maleic acid, 72 g THF, and 141 g NMP. The dope was cast with a 7 mil blade onto a woven nylon fabric (Texlon) at a speed of 4 ft/min. Air was blown over the surface of the membrane at a rate of 20 SCFH, and the membrane was then quenched in 6° C. water containing no additives. Membrane was solvent exchanged by immersion in IPA and then feed solution. The membrane was air dried and then conditioned in feed solution before mounting in the test cell. Initial test results for the membrane at −13° C. and 600 psi showed 4.9 GSFD flux and 89% rejection of lube oil. Conditioned membrane shows good rejection.

A casting dope was prepared with 78g of Matrimid 5218 (Ciba-Geigy), 4.5 g formamide, 4.5 g maleic acid, 72 g THF, and 141 g NMP. The dope was cast with a 7 mil blade onto a non-woven polyester fabric (Hollytex 3329) at a speed of 4 ft/min. Air was blown over the surface of the membrane at a rate of 20 SCFH, and the membrane was then quenched in 20° C. water containing 0.01% Triton X-100. Membrane was solvent exchanged by immersion in IPA, n-hexane, and then feed solution. The membrane was air dried and tested without further conditioning. Initial test results for the membrane at −10° C. and 600 psi showed 7.6 GSFD flux and 96% rejection of lube oil.

The non-woven polyester is a relatively dimensionally stable backing. This can be monitored by measuring membrane shrinkage which is the difference in width between the membrane as cast and the dried membrane. Example 6 had no observed shrinkage (0%). In contrast, the woven nylon exhibits significant shrinkage on drying of membrane, indicating insufficient dimensional stability in the backing. Shrinkage of 13.4% was observed in Example 1. Membrane shrinkage of 2.4% was measured for Example 2.

What is claimed is:

1. An asymmetric polyimide membrane comprising a unitary membrane having a thin dense skin supported on a porous substructure and a support, characterized in that
   (a) the skin and substructure are composed of a fully imidized polymer based on 5(6)-amino-1-(4'-aminophenyl)-1,3,3-trimethyl-indane and benzophenone tetracarboxylic dianhydride;
   (b) the membrane exhibits at least about 80% lube oil rejection, and a flow rate of at least about two gallons per square feet per day in a temperature range of about 25 to −25° F.;
   (c) the membrane is made by preparing a polyimide dope solution consisting essentially of:
      (1) a fully imidized polyimide polymer based on 5(6)-amino-1-(4'-aminophenyl)-1,3,3-trimethylindane and benzophenone tetracarboxylic dianhydride present in amounts of 20 to 28% by weight of said dope solution;
      (2) a solvent system for said polyimide which is water miscible and is selected from the group consisting essentially of N-methyl-2-pyrrolidone, tetrahydrofuran, N,N-dimethylformamide, dioxane, γ-butyrolactone, water, ketones, alcohols, formamide, or a mixture thereof;
      (3) optionally, a viscosity enhancer present in amounts of less than 3% by weight of said dope solution consisting essentially of polyvinyl pyrrolidones, polyethylene glycols or urethanes;
      (4) optionally, a void suppressor present in amounts of less than 5% by weight of said dope solution consisting essentially of maleic acid;
   casting a film of said polyimide dope solution onto a supporting substrate; after an evaporation period, immersing said film cast on said substrate into a coagulating medium consisting essentially of water, alcohol, ketones or mixtures thereof; treating the asymmetric membrane with a wash bath or baths containing a conditioning agent.

2. The membrane of claim 1 further comprising a hydrocarbon-based conditioning agent.

3. The membrane of claim 2, wherein the conditioning agent is selected from the group comprising substituted or unsubstituted long chain hydrocarbons, glycols, glycerols, and lube oil, or mixtures thereof.

4. The membrane of claim 2, wherein the support has a shrinkage of not more than about 2%.

5. A method of separating low molecular weight organic materials from a feedstream by hyperfiltration, the steps comprising contacting a liquid feedstream with a separating surface of an asymmetric polyimide membrane consisting essentially of a skin and substructure composed of a fully imidized polymer based on 5(6)-amino-1-(4'-aminophenyl)-1,3,3-trimethylindane and benzophenone tetracarboxylic dianhydride made by preparing a polyimide dope solution consisting essentially of:

(1) a fully imidized polyimide polymer based on 5(6)-amino-1-(4'-aminophenyl)-1,3,3-trimethylindane and benzophenone tetracarboxylic dianhydride present in amounts of 20 to 28% by weight of said dope solution;

(2) a solvent system for said polyimide which is water miscible and is selected from the ground consisting essentially of N-methyl-2-pyrrolidone, tetrahydrofuran, N,N-dimethylformamide, dioxane, -butyrolactone, water, ketones, alcohols, formamide, or mixture thereof;

(3) optionally, a viscosity enhancer present in amounts of less than 3% by weight of said dope solution consisting essentially of polyvinyl pyrrolidones, polyethylene glycols or urethanes;

(4) optionally, a void suppressor present in amounts of less than 5% by weight of said dope solution consisting essentially of maleic acid;

casting a film of said polyimide dope solution onto a supporting substrate; after an evaporation period, immersing said film cast on said substrate into a coagulating medium consisting essentially of water, alcohol, ketones or mixtures thereof; treating the asymmetric membrane with a wash bath or baths containing a conditioning agent, under membrane separation conditions so that at least one component of the feedstream permeates through the membrane to be removed from a second side thereof.

6. The method of claim 5 wherein the membrane further comprises a conditioning agent selected from the group comprising substituted or unsubstituted long chain hydrocarbons, glycols, glycerols, and lube oil, or mixtures thereof.

7. The method of claim 5, wherein the feedstream comprises a mixture of lube oil and solvent.

8. The method of claim 7 wherein the membrane exhibits at least about 80% lube oil rejection and a flow rate of at least about 2 gallons per square foot per day at a temperature of about 25° to −25° F.

9. The method of claim 5, wherein the membrane further comprises a support layer having shrinkage of not more than about 2.0%.

10. The method of claim 9 wherein the support layer is non-woven polyester, polyethylene, or polypropylene.

* * * * *

UNITED STATES PATENT AND TRADEMARK OFFICE
CERTIFICATE OF CORRECTION

PATENT NO. : 5,429,748
DATED : July 4, 1995
INVENTOR(S) : Lloyd S. White; I-Fan Wang; Bhupender S. Minhas It is certified that error appears in the above-indentified patent and that said Letters Patent is hereby corrected as shown below:

Column 9:

Claim 5, line 17, change "ground" to -- group --.

Claim 5, line 19, change "-butyrolactone" to --$\gamma$-butyrolactone--.

Signed and Sealed this

Nineteenth Day of September, 1995

Attest:

BRUCE LEHMAN

Attesting Officer

Commissioner of Patents and Trademarks